United States Patent
Wu et al.

(10) Patent No.: US 7,843,989 B2
(45) Date of Patent: Nov. 30, 2010

(54) SYSTEMS AND METHODS FOR EMBEDDING A FIRST SIGNAL IN THE CODING OF A SECOND SIGNAL

(75) Inventors: Huaming Wu, Vancouver, WA (US); Lizhong Zheng, Canton, MA (US)

(73) Assignee: Sharp Laboratories of America, Inc., Camas, WA (US)

( * ) Notice: Subject to any disclaimer, the term of this patent is extended or adjusted under 35 U.S.C. 154(b) by 796 days.

(21) Appl. No.: 11/768,789

(22) Filed: Jun. 26, 2007

(65) Prior Publication Data

US 2009/0003420 A1    Jan. 1, 2009

(51) Int. Cl.
 *H04L 27/30* (2006.01)
(52) U.S. Cl. ............... 375/146; 375/141; 375/220; 375/295; 370/278; 370/319; 370/465
(58) Field of Classification Search ............ 375/140, 375/141, 146, 220, 260, 295; 370/278, 282, 370/319–321, 464, 465, 478–480
See application file for complete search history.

(56) References Cited

U.S. PATENT DOCUMENTS 7,408,998 B2 * 8/2008 Kowalski ............... 375/260

2008/0253318 A1 * 10/2008 Malladi et al. ............ 370/328
2009/0245212 A1 * 10/2009 Sambhwani et al. ....... 370/336
2010/0074120 A1 * 3/2010 Bergman et al. .......... 370/244

OTHER PUBLICATIONS

Nokia Siemens Networks, Nokia, "Performance of CQI+ACK/NACK transmission on PUCCH," R1-073003, Jun. 2007.
Sharp, "Improved Flexibility/Performance CQI+ACK/NACK Coding in the E-UTRA Uplink," R1-073321, Aug. 2007.
NTT DoCoMo, "LS on target quality on L1/L2 control channel," 3GPP TSG WG1 meeting #48b, Mar. 2007.
Motorola, "Uplink transmission of CQI and Ack/Nack," 3GPP TSG RAN1 meeting #49bis, Jun. 2007.
Qualcomm Europe, "Coding structure for CQI+ACK," 3GPP TSG Ran WG1 meeting #49bis, Jun. 2007.

* cited by examiner

*Primary Examiner*—Dac V Ha
(74) *Attorney, Agent, or Firm*—Austin Rapp & Hardman

(57) ABSTRACT

A method for embedding a first signal in the coding of a second signal is described. A value of the first signal is determined. A codebook based on the value of the first signal is generated. A second signal is encoded using a codeword from the generated codebook. The encoded second signal is modulated into a plurality of symbols, wherein the symbols are distributed according to the value of the first signal. The modulated symbols are inserted into one or more time slots of a sequence.

31 Claims, 10 Drawing Sheets

SYSTEMS AND METHODS FOR EMBEDDING A FIRST SIGNAL IN THE CODING OF A SECOND SIGNAL

TECHNICAL FIELD

The present invention relates generally to wireless communications and wireless communications-related technology. More specifically, the present invention relates to systems and methods for embedding a first signal in the coding of a second signal.

BACKGROUND

A wireless communication system typically includes a base station in wireless communication with a plurality of user devices (which may also be referred to as user equipment, mobile stations, subscriber units, access terminals, etc.). The base station transmits data to the user devices over a radio frequency (RF) communication channel. The terms "downlink" and "forward link" refer to transmission from a base station to a user device, while the terms "uplink" and "reverse link" refer to transmission from a user device to a base station.

The $3^{rd}$ Generation Partnership Project (3GPP) is a collaboration of standards organizations throughout the world. The goal of 3GPP is to make a globally applicable third generation (3G) mobile phone system specification within the scope of the IMT-2000 (International Mobile Telecommunications-2000) standard as defined by the International Telecommunication Union. The 3GPP Long Term Evolution ("LTE") Committee is considering Orthogonal Frequency Division Multiplexing (OFDM) as well as OFDM/OQAM (Orthogonal Frequency Division Multiplexing/Offset Quadrature Amplitude Modulation), as a method for downlink transmission, as well as OFDM transmission on the uplink.

Wireless communications systems (e.g., Time Division Multiple Access (TDMA), OFDM, Code Division Multiple Access (CDMA), Frequency Division Multiple Access (FDMA), etc.) usually calculate an estimation of a channel impulse response between the antennas of a user device and the antennas of a base station for coherent receiving. Channel estimation may involve transmitting known reference signals that are multiplexed with the data. Reference signals may include a single frequency and are transmitted over the communication systems for supervisory, control, equalization, continuity, synchronization, etc. Wireless communication systems may include one or more mobile stations and one or more base stations that each transmits a reference signal. In addition, wireless communication systems may transmit a channel quality indicator signal (CQI), acknowledgment signals (ACK) and negative acknowledgment signals (NAK). The CQI and the ACK/NAK may be coded jointly or separately. However, performance may diminish and/or the acceptable error rates may increase if the CQI and the ACK/NACK are jointly or separately coded. As such, benefits may be realized from systems and methods that embed the coding of the ACK/NACK into the coding of the CQI.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

Figure 1:
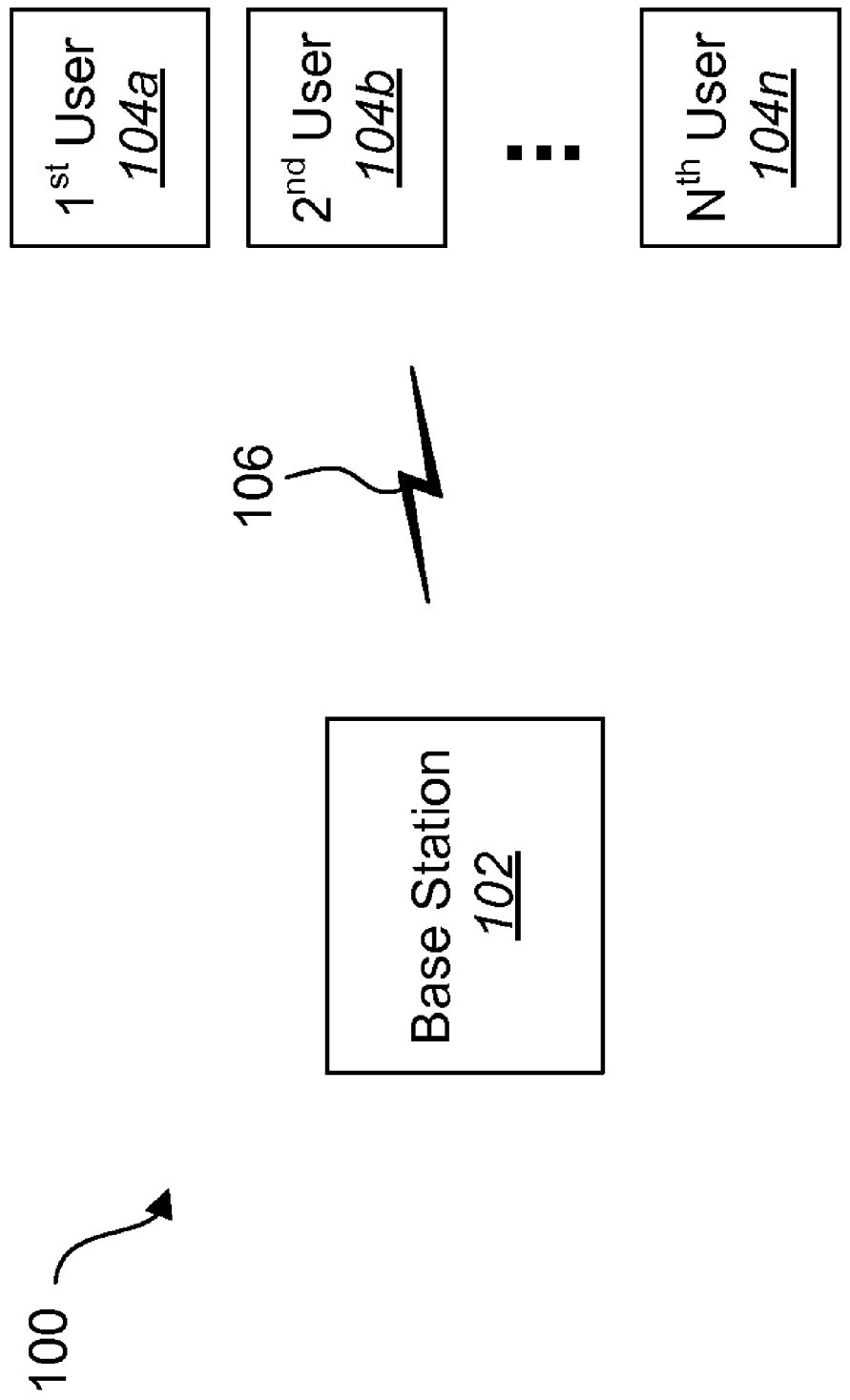
FIG. 1 illustrates an exemplary wireless communication system in which embodiments may be practiced.

A method for embedding a first signal in the coding of a second signal is described. A value of the first signal is determined. A codebook based on the value of the first signal is generated. A second signal is encoded using a codeword from the generated codebook. The encoded second signal is modulated into a plurality of symbols, wherein the symbols are distributed according to the value of the first signal. The modulated symbols are inserted into one or more time slots of a sequence.

In one embodiment, the first signal is an acknowledgement (ACK) signal. In another embodiment, the first signal is a negative acknowledgment (NACK) signal. In a further embodiment, the second signal is a channel quality indicator (CQI) signal. The first signal may have two bits and have the values of 00, 01, 10 or 11. The second signal may have eight bits.

In one embodiment, the codeword has 24-bits. The encoded second signal may be modulated according to Quadrature Phase-Shift Key (QPSK) modulation. The distribution of the modulated symbols may be determined by an error quality target for the first signal and the second signal.

A device that is configured to embed a first signal in the coding of a second signal is also described. The device includes a processor and memory in electronic communication with the processor. Instructions are stored in the memory. A value of a first signal is determined. A codebook is generated based on the value of the first signal. A second signal is encoded using a codeword from the generated codebook. The encoded second signal is modulated into a plurality of symbols, wherein the symbols are distributed according to the value of the first signal. The modulated symbols are inserted into one or more time slots of a sequence.

A computer-readable medium comprising executable instructions for embedding a first signal in the coding of a second signal is also described. A value of a first signal is determined. A codebook is generated based on the value of the first signal. A second signal is encoded using a codeword from the generated codebook. The encoded second signal is modulated into a plurality of symbols, wherein the symbols are distributed according to the value of the first signal. The modulated symbols are inserted into one or more time slots of a sequence.

A method for decoding a first signal embedded in the coding of a second signal is also described. A sequence including a plurality of symbols is received. The distribution of the received symbols is determined. A first signal is decoded based on the determined distribution of the symbols. A codebook is generated based on the value of the first signal. A second signal is decoded using the generated codebook.

Various embodiments of the invention are now described with reference to the Figures, where like reference numbers indicate identical or functionally similar elements. The embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments.

Many features of the embodiments disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, such software may include any type of computer instruction or computer executable code located within a memory device and/or transmitted as electronic signals over a system bus or network. Software that implements the functionality associated with components described herein may comprise a single instruction, or many instructions, and may be distributed over several different code segments, among different programs, and across several memory devices.

As used herein, the terms "an embodiment", "embodiment", "embodiments", "the embodiment", "the embodiments", "one or more embodiments", "some embodiments", "certain embodiments", "one embodiment", "another embodiment" and the like mean "one or more (but not necessarily all) embodiments of the disclosed invention(s)", unless expressly specified otherwise.

The term "determining" (and grammatical variants thereof) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

A channel quality indicator (CQI) and acknowledgment/negative acknowledgement (ACK/NACK) are two types of control signals in a cellular system. Typically, the desired quality for CQI and ACK/NACK are different. In one embodiment, the desired quality is a function of a message error rate and delay. Table 1 illustrates an example of desired target qualities for these two types of signals.

TABLE 1

Control Signals Target Quality

| Event | Target Quality |
| --- | --- |
| NACK to ACK error | $10^{-4}$ |
| CQI block error rate | $10^{-2} - 10^{-1}$ |

In one embodiment, the CQI and ACK/NACK may be encoded separately and multiplexed in a Time Division Multiplex (TDM) fashion. In other words, the CQI and ACK/NACK symbols (after modulation) may be placed in different time slots of a sequence. An advantage of this process includes greater control of the CQI and ACK/NACK target qualities. However, coding these signals separately may cause the communications link to perform worse than a communications link that includes a joint coding of the CQI and ACK/NACK.

In another embodiment, the CQI and ACK/NACK are jointly coded and then multiplexed together as a single type of information. An advantage of this embodiment includes an improvement in performance. However, if jointly coded, the CQI and ACK/NACK may have the same error target quality, which may not be desired. In particular, this means that channel resources may be used inefficiently by overprotecting one of the two signals (the CQI or the ACK/NACK) or, conversely, insufficient channel resources are used resulting in under-protection of one of the two signals. As such, the present systems and methods are directed towards embedded coding of the ACK/NACK into the coding of the CQI.

FIG. 1 illustrates an exemplary wireless communication system 100 in which embodiments may be practiced. A base station 102 is in wireless communication with a plurality of user devices 104 (which may also be referred to as user equipment, mobile stations, subscriber units, access terminals, etc.). A first user device 104a, a second user device 104b, and an Nth user device 104n are shown in FIG. 1. The base station 102 transmits data to the user devices 104 over a radio frequency (RF) communication channel 106.

As used herein, the term "transmitter" refers to any component or device that transmits signals. A transmitter may be implemented in a base station 102 that transmits signals to one or more user devices 104. Alternatively, a transmitter may be implemented in a user device 104 that transmits signals to one or more base stations 102.

The term "receiver" refers to any component or device that receives signals. A receiver may be implemented in a user device 104 that receives signals from one or more base stations 102. Alternatively, a receiver may be implemented in a base station 102 that receives signals from one or more user devices 104.

The communications system 100 may be Orthogonal Frequency Division Multiplexing (OFDM) system. In addition, the system 100 may be Code Division Multiple Access (CDMA) system, a Time Division Multiple Access (TDMA) system, a Frequency Division Multiple Access (FDMA) system, etc.

Figure 2:
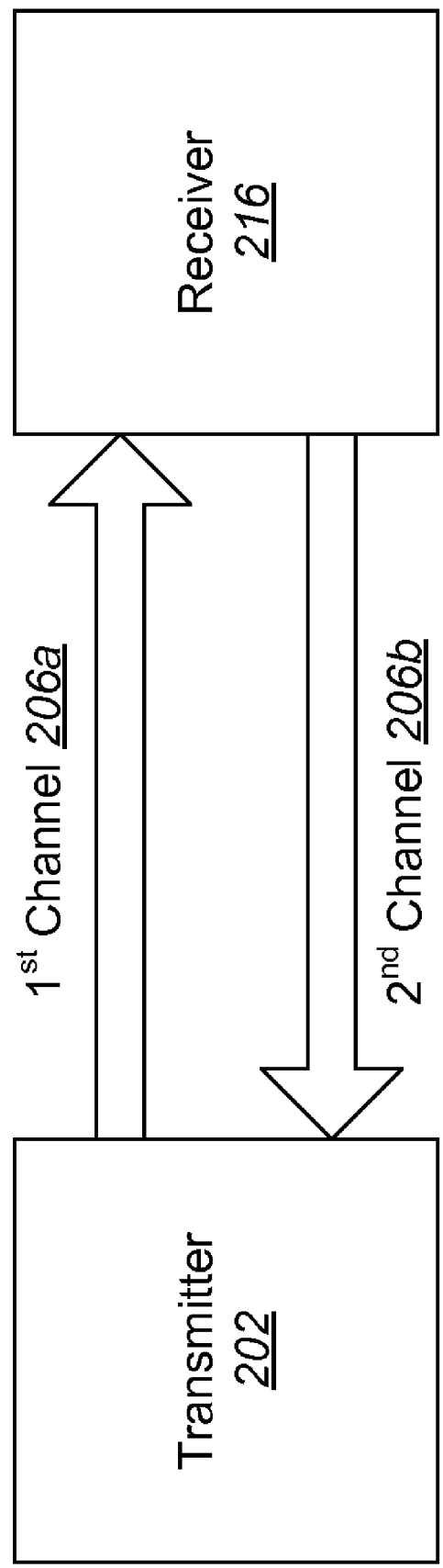
FIG. 2 illustrates communication channels that may exist between a transmitter and a receiver according to an embodiment.

FIG. 2 illustrates communication channels 206 that may exist between a transmitter 202 and a receiver 216 according to an embodiment. As shown, communication from the transmitter 202 to the receiver 216 may occur over a first communication channel 206a. Communication from the receiver 216 to the transmitter 202 may occur over a second communication channel 206b.

The first communication channel 206a and the second communication channel 206b may be separate communication channels 206. For example, there may be no overlap between the transmission band of the first communication channel 206a and the transmission band of the second communication channel 206b. The first communication channel 206a may also be referred to as a downlink, forward link, etc. The second communication channel 206b may be referred to as an uplink, reverse link, etc.

Figure 3:
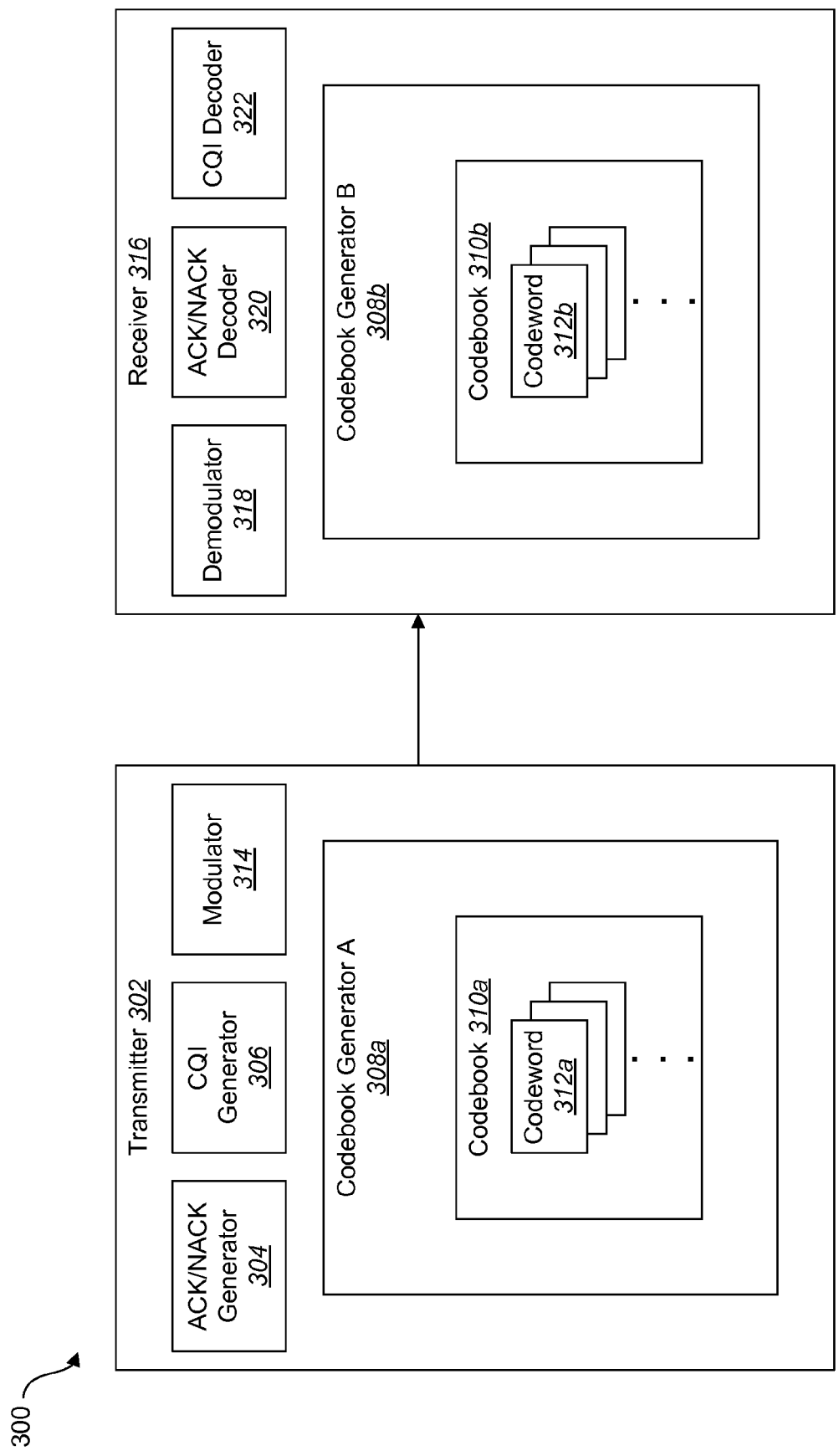
FIG. 3 is a further embodiment of the transmitter and the receiver that may be implemented with the present systems and methods.

FIG. 3 is a further embodiment 300 of a transmitter 302 and a receiver 316. The transmitter 302 may include a ACK/NACK generator 304, a CQI generator 306, codebook generator A 308a and a modulator 314. The ACK/NACK generator 304 may generate a ACK/NACK signal. In one embodiment, the generated ACK/NACK signal includes two bits. As such, the ACK/NACK signal may be "00", "01", "10" or "11". The ACK/NACK generator 304 may generate ACK/NACK signals with more or less than two bits. The CQI generator 306 may generate a CQI signal. In one embodiment, the generated CQI signal includes eight bits. However, the CQI generator 306 may generate a CQI signal with more or less than eight bits. Codebook generator A 308a may generate a codebook 310a based upon the generated ACK/NACK signal. The codebook 310a includes a plurality of codewords 312a. One of the plurality of codewords 312a may encode the CQI signal. The modulator 314 may perform a modulation on the encoded CQI signal. In one embodiment, the modulator 314 may implement Quadrature Phase Shift Keying (QPSK) modulation. The modulator 314 may produce a plurality of data symbols. The symbols may be organized in a particular manner to indicate to the receiver 316 the value of the ACK/NACK signal. In other words, the ACK/NACK signal is embedded in the coding of the CQI signal.

The receiver 316 may include a demodulator 318, a ACK/NACK decoder 320, a CQI decoder 322 and codebook generator B 308b. The demodulator 318 may demodulate the plurality of modulated symbols. The ACK/NACK decoder 320 may determine the value of the generated ACK/NACK signal. Codebook generator B 308b may generate a codebook 310b based on the decoded value of the ACK/NACK signal that includes a plurality of codewords 312b. In one embodiment, codebook generator B 308b generates a codebook 310b that is identical to the codebook 310a generated by codebook generator A 308a. The CQI decoder 322 may utilize the codebook 310b generated by codebook generator B 308b to decode the CQI. In one embodiment, the CQI decoder 322 decodes the CQI using a maximum likelihood detector.

Figure 4:
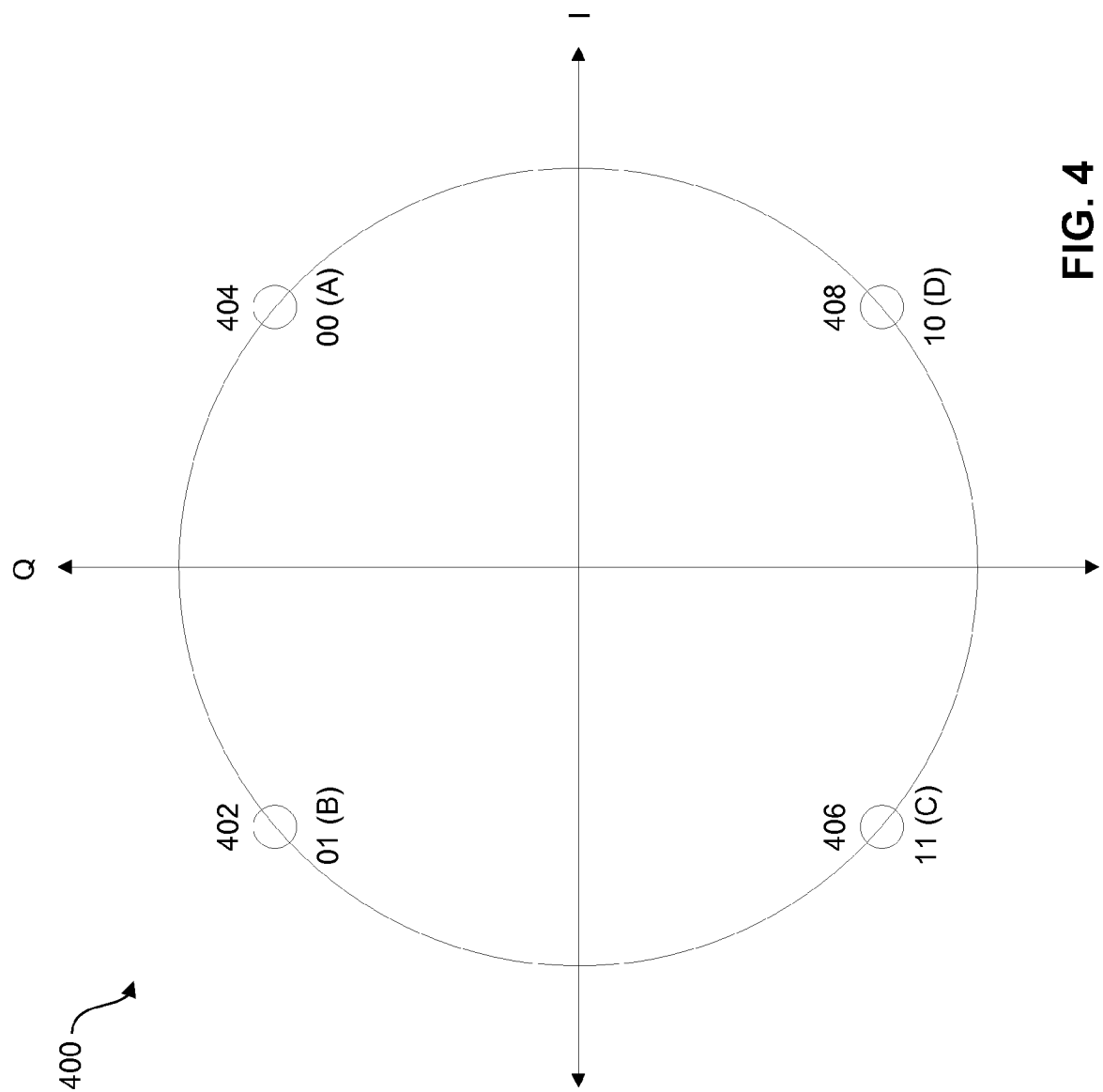
FIG. 4 is one embodiment of a constellation diagram for Quadrature Phase Shift Keying (QPSK) modulation.

FIG. 4 is one embodiment of a constellation diagram 400 for QPSK modulation. QPSK modulation may use four points 402, 404, 406, 408 on the constellation diagram 400, equis-paced around a circle. With four points 402, 404, 406 and 408, QPSK modulation may encode two bits per symbol. For example, the bits "01" may be encoded as the symbol "B", the bits "00" may be encoded as the symbol "A", the bits "11" may be encoded as the symbol "C" and the bits "10" may be encoded as the symbol "D".

Figure 5:
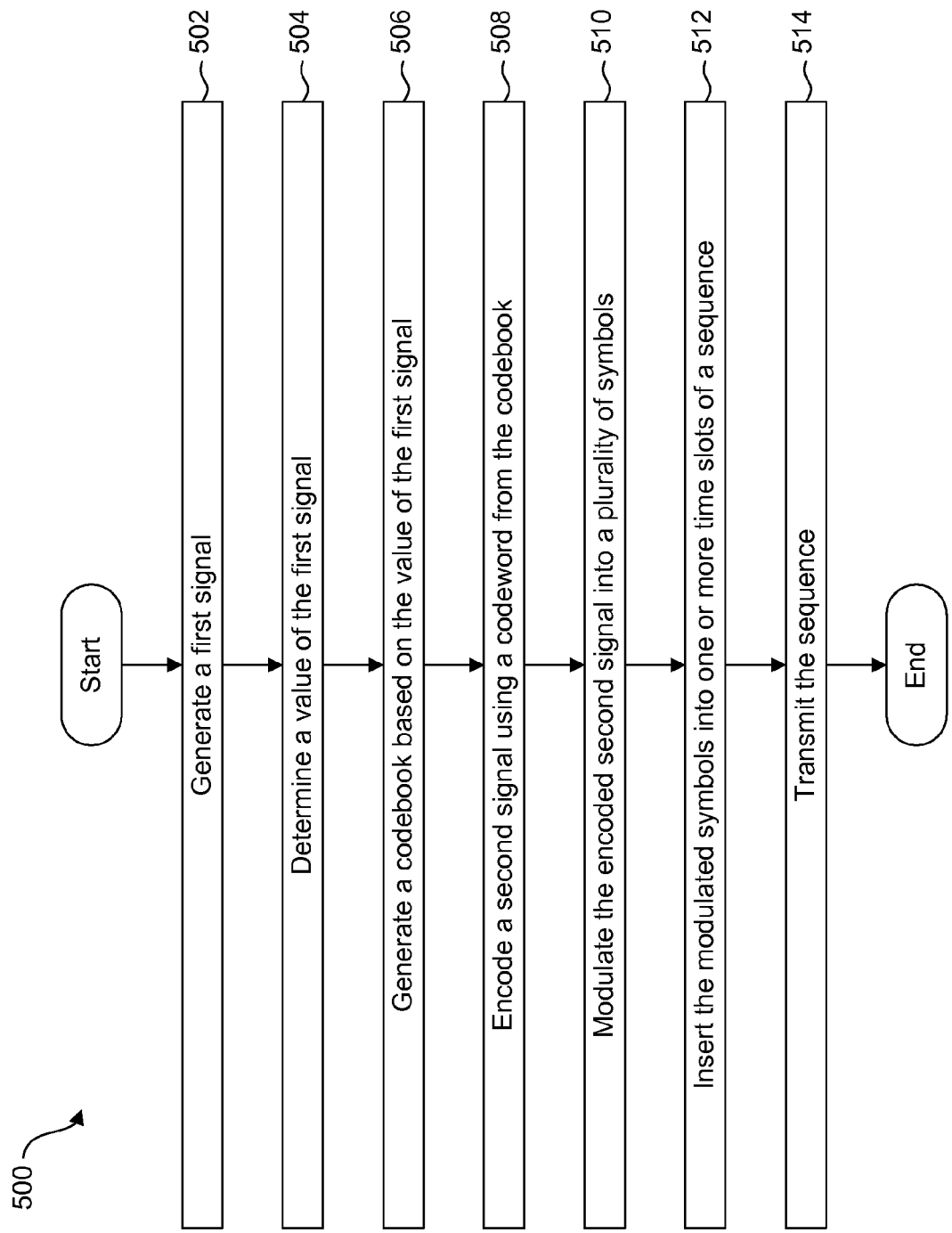
FIG. 5 is a flow diagram illustrating one embodiment of a method for embedding a first signal within the coding of a second signal.

FIG. 5 is a flow diagram illustrating one embodiment of a method 500 for embedding a first signal within the coding of a second signal. The method 500 may be implemented by a transmitter 202. In one embodiment, the method 500 is implemented by a user equipment, mobile station, etc. The first signal may be generated 502. The first signal may include an ACK/NACK signal. An ACK may indicate the successful receipt of a response. The NACK may be sent to indicate the unsuccessful receipt of the response. A value of the first signal may be determined 504. In one embodiment, the first signal includes two bits. The possible values of the two bits of the first signal may be "00", "01", "10" or "11". A codebook may be generated 506 based on the value of the first signal. For example, a first codebook may be generated 506 if the first signal is determined to have a value of "00", a second codebook may be generated 506 if the first signal has a value of "01", etc.

In one embodiment, the generated codebook includes one or more codewords. A second signal may be encoded 508 using one of the codewords from the codebook. The second signal may include a CQI signal with eight bits. The encoded second signal may be modulated 510 into a plurality of symbols. The encoded second signal may be modulated 510 through QPSK. The modulated symbols may be inserted 512 into one or more time slots of a sequence. The sequence may be transmitted 514 to a receiver. In one embodiment, the first signal is embedded into the coding of the second signal through the codebook that is generated. In other words, a receiver may decode the embedded first signal by determining the codebook that was generated to encode the second signal.

Figure 6:
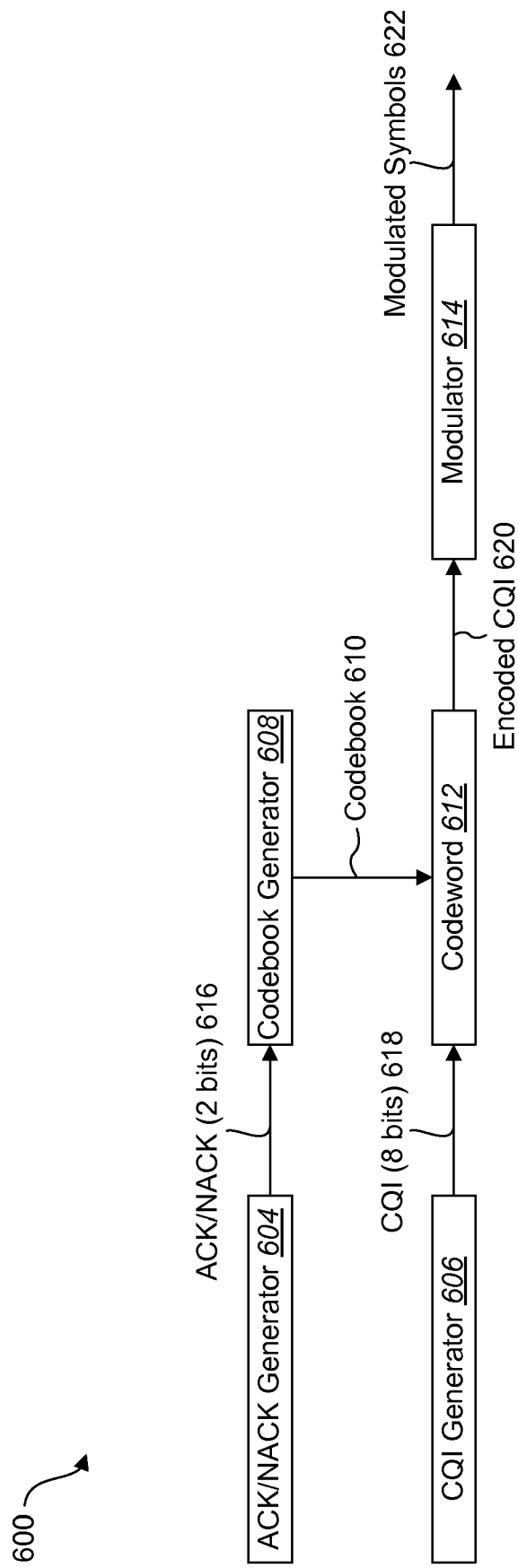
FIG. 6 is a further embodiment of a method for embedding an acknowledgment/negative acknowledgement (ACK/NACK) signal into the coding of a channel quality indicator (CQI) signal.

FIG. 6 is a further embodiment of a method 600 for embedding an ACK/NACK signal 616 into the coding of a CQI signal 618. An ACK/NACK generator 604 may generate the ACK/NACK signal 616. The ACK/NACK signal 616 may include two bits. Similarly, a CQI generator 606 may generate the CQI signal 618. In one embodiment, the CQI signal 618 may include eight bits. A codebook generator 608 generates a codebook 610 based on the value of the two bits of the ACK/NACK signal 616. A codeword 612 from the codebook 610 is used to encode the CQI signal 618. The codeword 612 may be a 24-bit codeword. The encoded CQI signal 620 may be modulated by a modulator 614. Modulated symbols 622 may be produced from the modulator 614. In one embodiment, the modulated symbols are twelve QPSK symbols. The twelve symbols may be a combination of the symbols A 404, B 402, C 406 and D 408 from FIG. 4. As previously explained, the twelve modulated symbols 622 may be inserted into time slots of a sequence. The following example further illustrates the method 600 for embedding an ACK/NACK signal 616 into the coding of a CQI signal 618.

The generated ACK/NACK signal 616 may have the value of "00". Based on the QPSK constellation diagram 400, the modulated symbols 622 should include more of the A 404 symbol than any other symbol. For example, there may be six A 404 symbols, two B 402 symbols, two C 406 symbols and two D 408 symbols as the output of the modulator 614. The number of possible codewords 612 that may be used to encode the CQI signal 618 may be determined by the different ordering of the symbols A 404, B 402, C 406 and D 408. In this example, the total number of possible codewords is 83,160 which is larger than 256, the number of all possible CQI signal 618 sequences. In one embodiment, 256 codewords are randomly chosen among the possible 83,160 codewords. Table 2 shows an example of a codebook 610 that may be used to encode the CQI signal 618 when the ACK/NACK signal 616 is "00".

TABLE 2

Example Codebook when ACK/NACK is "00"

| CQI | Codeword | Symbols |
|---|---|---|
| 00000000 | 000000000000010111111010 | AAAAAABBCCDD |
| ... | ... | ... |
| 11111111 | 100000000000010111111000 | DAAAAABBCCDA |

In a similar, manner, a codebook may be generated when ACK/NACK is "01", "11" or "10" by distributing the symbols so that the modulated symbols include more B, C or D symbols. Table 3 shows an example of how the symbols 622 may be distributed.

TABLE 3

Examples of Symbol Distributions

| ACK/NACK | Distribution of Symbols |
|---|---|
| 00 | 6A, 2B, 2C, 2D |
| 01 | 2A, 6B, 2C, 2D |
| 11 | 2A, 2B, 6C, 2D |
| 10 | 2A, 2B, 2C, 6D |

In one embodiment, other distributions of symbols may exist as long as the occurrence of A 404, B 402, C 406 and D 408 symbols are not equal and the number of different orderings of that symbol distribution is larger than the number of all possible CQI signal 618 sequences. For example, another possible symbol distribution when ACK/NACK is "00" may include 5A, 2B, 3C and 2D. The distribution of symbols may be determined in order to meet different error quality targets for CQI signals 618 and ACK/NACK signals 616.

The CQI and the ACK/NACK signals may have different target qualities as shown above in Table 1. In addition, the target qualities of the CQI and the ACK/NACK signals may be controlled by choosing different symbol distributions as shown in Table 3. Embedded coding may produce comparable performance (error probability) with joint coding and separate coding for CQI signals 618. Embedded coding of the ACK/NACK signal 616 may have improved performance than separate and joint coding.

Figure 7:
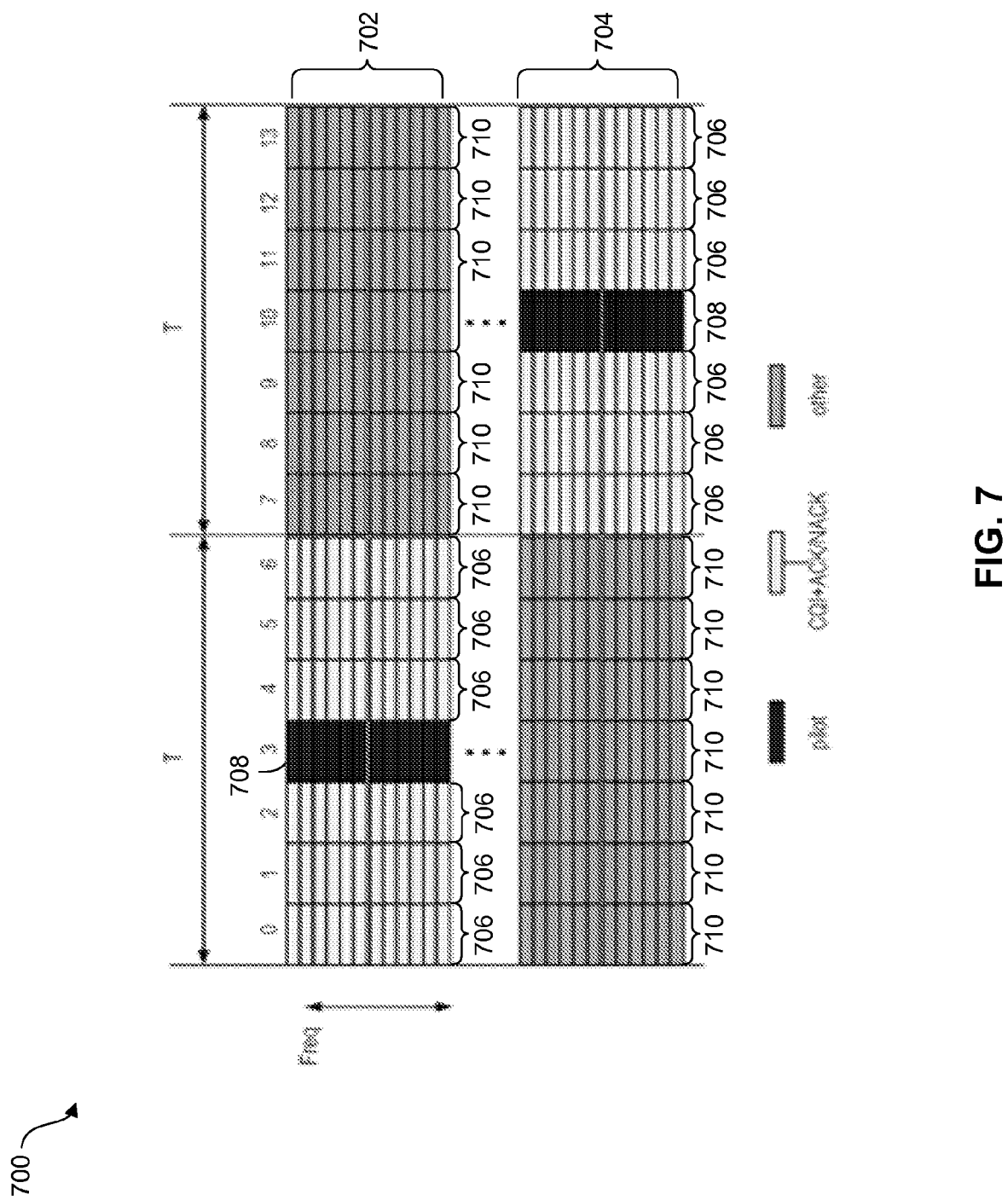
FIG. 7 illustrates one embodiment of one or more sequences that may be transmitted to the receiver.

FIG. 7 illustrates one embodiment 700 of one or more sequences 702, 704 that may be transmitted to a receiver. The sequences 702, 704 include a pilot slot 708 which may be used to transmit a pilot channel. Further, the sequences 702, 704 include combination time slots 706 which may include the CQI signal and the ACK/NACK signal. As previously explained, modulated symbols may be inserted into the combination time slots 706. The modulated symbols include information relating to the encoded CQI signal the embedded ACK/NACK signal. The sequences 702, 704 also include other time slots 710 which may be used to transmit additional information.

Figure 8:
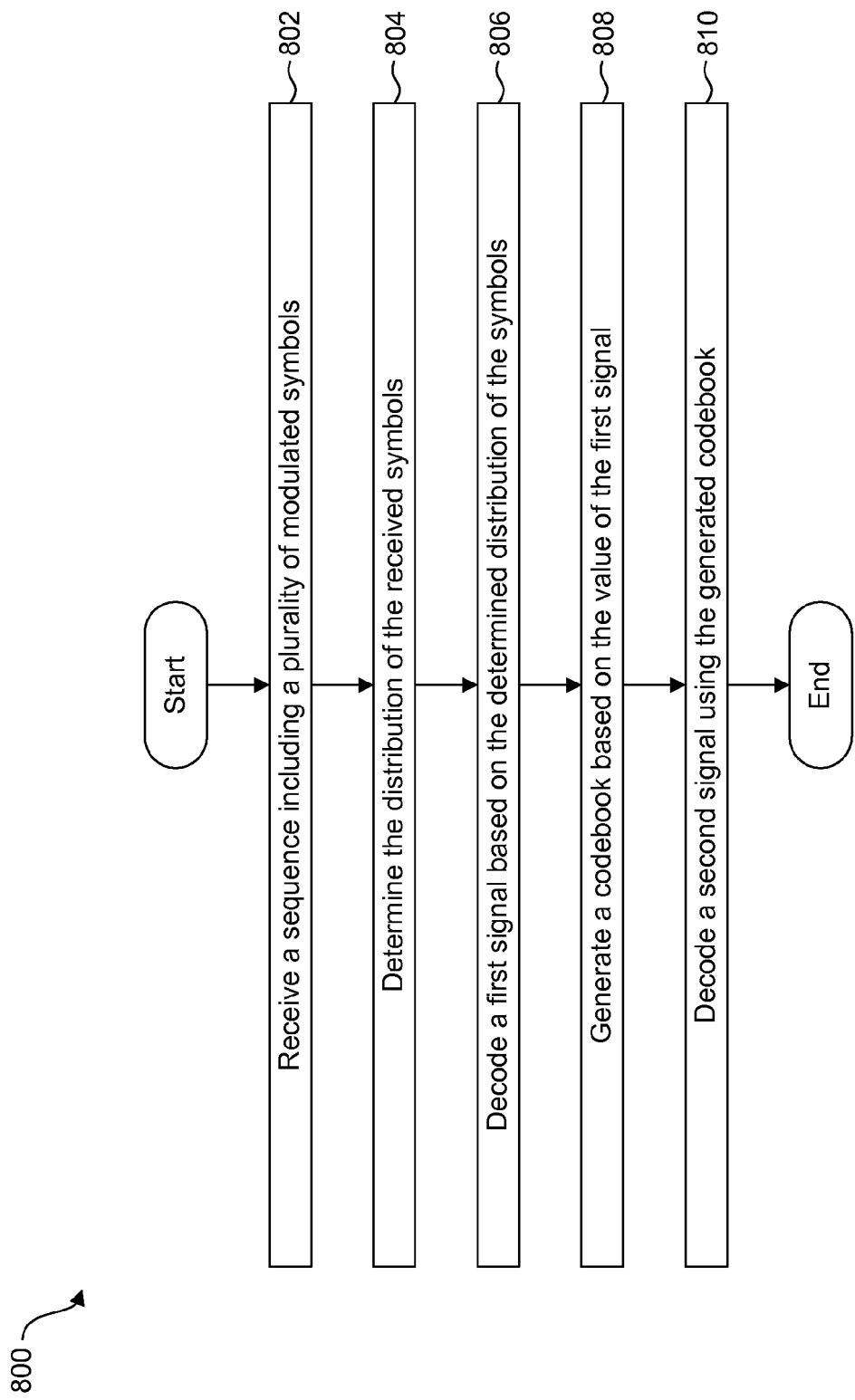
FIG. 8 is a flow diagram illustrating one embodiment of a method for decoding a second signal and a first signal that is embedded in the coding of the second signal.

FIG. 8 is a flow diagram illustrating one embodiment of a method 800 for decoding a second signal and a first signal that is embedded in the coding of the second signal. The first signal may include the ACK/NACK signal 616 and the second signal may include the CQI signal 618. The method 800 may be implemented by the receiver 216. In a further embodiment, the method 800 may be implemented by the base station 102 or another user device 104. A sequence including a plurality of modulated symbols is received 802. The distribution of the received symbols may be determined 804. The first signal may be decoded 806 based upon the distribution of the symbols. For example, a ACK/NACK signal 616 may be decoded 806 by evaluating the distribution of the received symbols, such as QPSK symbols. In one embodiment, let $N_A$, $N_B$, $N_C$ and $N_D$ denote the corresponding number of A 404, B 402, C 406 and D 408 symbols that occur in the received 802 sequence. Table 4 illustrates an example decoding rule for the ACK/NACK signal 616.

TABLE 4

Example of a Decoding Rule for the ACK/NACK signal

| Condition | Determined ACK/NACK Value |
|---|---|
| $N_A$ is the largest among $N_A$, $N_B$, $N_C$ and $N_D$ | 00 |
| $N_B$ is the largest among $N_A$, $N_B$, $N_C$ and $N_D$ | 01 |
| $N_C$ is the largest among $N_A$, $N_B$, $N_C$ and $N_D$ | 11 |
| $N_D$ is the largest among $N_A$, $N_B$, $N_C$ and $N_D$ | 10 |

In one embodiment, a codebook is generated 808 based on the value of the decoded first signal. For example, the codebook is generated 808 based on the determined ACK/NACK value. The second signal may be decoded 810 using the generated codebook. In one embodiment, the decoding of the CQI signal 618 may be done using a maximum likelihood detector.

Figure 9:
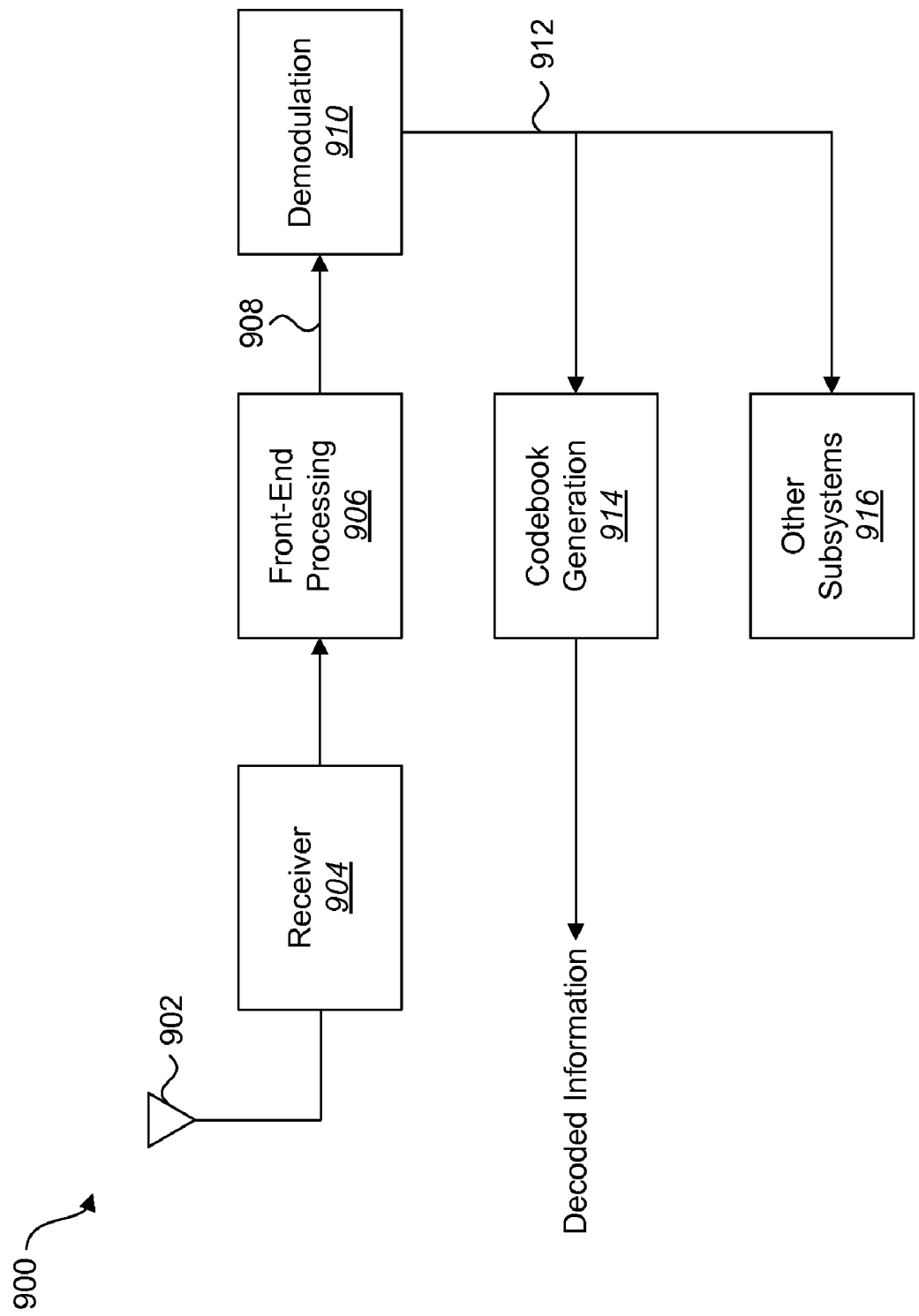
FIG. 9 illustrates a block diagram of certain components in an embodiment of the receiver.

FIG. 9 illustrates a block diagram 900 of certain components in an embodiment of a receiver 904. Other components that are typically included in the receiver 904 may not be illustrated for the purpose of focusing on the novel features of the embodiments herein.

A signal may be received at an antenna 902. In one embodiment, the signal includes symbols that relate to an encoded CQI signal 618 and an encoded ACK/NACK signal 616. The received signal is provided by the antenna 902 to the receiver 904. The receiver 904 down-converts the received signal and provides it to a front-end processing component 906. The front-end processing component 906 may provide the signal 908 to a demodulation component 910. The demodulation component 910 may demodulate the symbols in order to determine the value of the encoded ACK/NACK signal 616. The demodulated symbols 912 may be sent to a codebook generation component 914 which generates a codebook based on the value of the ACK/NACK signal 616. The generated codebook may be utilized to decode the CQI signal 618 and provide decoded information. The demodulation component 910 may also provide the demodulated symbols 912 to other subsystems 916.

Figure 10:
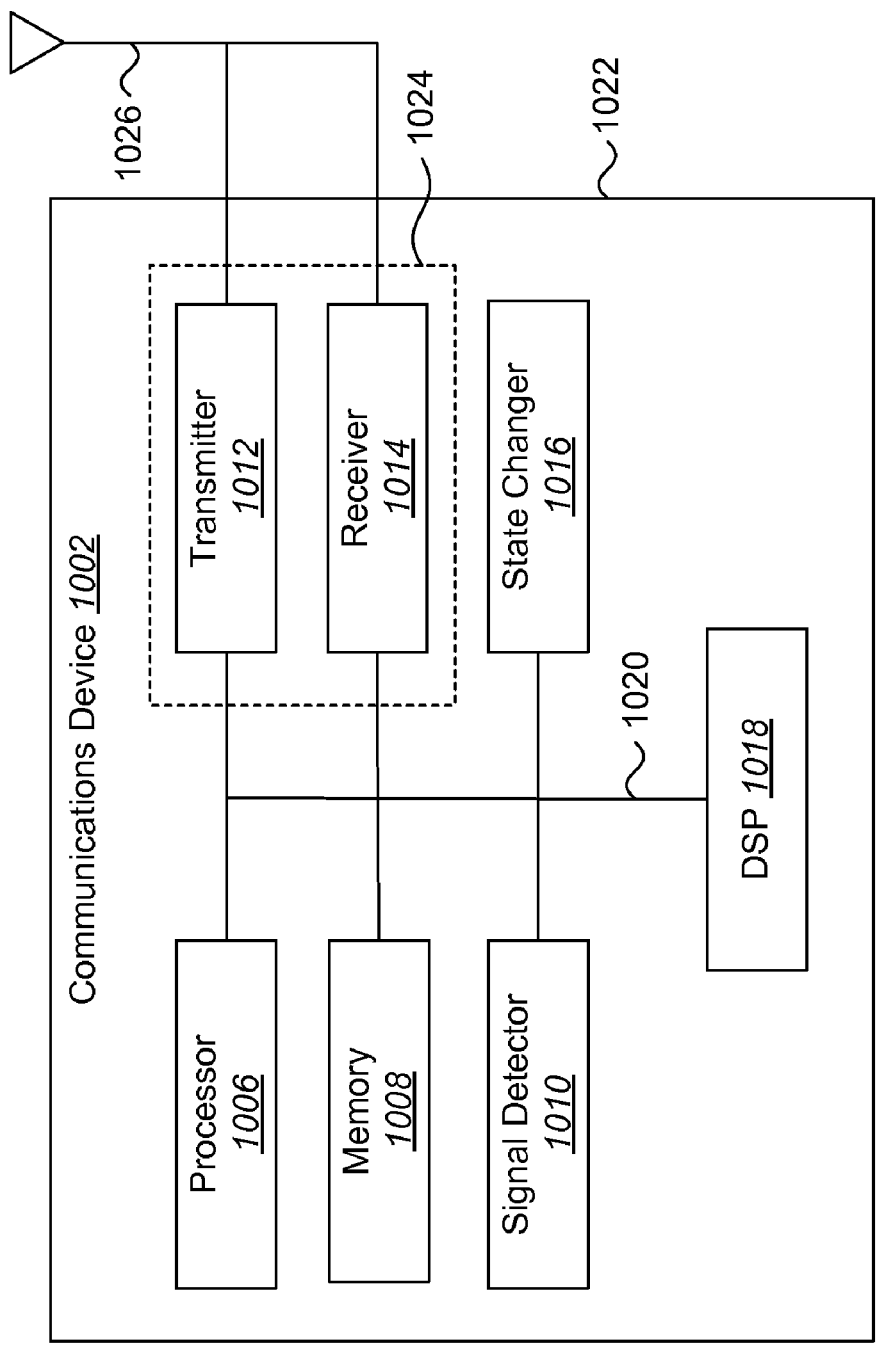
FIG. 10 illustrates various components that may be utilized in a communications device.

FIG. 10 illustrates various components that may be utilized in a communications device 1002. The communications device 1002 may include any type of communications device such as a mobile station, a cell phone, an access terminal, user equipment, a base station transceiver, a base station controller, etc. The communications device 1002 includes a processor 1006 which controls operation of the communications device 1002. The processor 1006 may also be referred to as a CPU. Memory 1008, which may include both read-only memory (ROM) and random access memory (RAM), provides instructions and data to the processor 1006. A portion of the memory 1008 may also include non-volatile random access memory (NVRAM).

The communications device 1002 may also include a housing 1022 that contains a transmitter 1012 and a receiver 1014 to allow transmission and reception of data. The transmitter 1012 and receiver 1014 may be combined into a transceiver 1024. An antenna 1026 is attached to the housing 1022 and electrically coupled to the transceiver 1024. Additional antennas (not shown) may also be used.

The communications device 1002 may also include a signal detector 1010 used to detect and quantify the level of signals received by the transceiver 1024. The signal detector 1010 detects such signals as total energy, pilot energy, power spectral density, and other signals.

A state changer 1016 controls the state of the communications device 1002 based on a current state and additional signals received by the transceiver 1024 and detected by the signal detector 1010. The communications device 1002 may be capable of operating in any one of a number of states.

The various components of the communications device 1002 are coupled together by a bus system 1020 which may include a power bus, a control signal bus, and a status signal bus in addition to a data bus. However, for the sake of clarity, the various buses are illustrated in FIG. 10 as the bus system 1020. The communications device 1002 may also include a digital signal processor (DSP) 1018 for use in processing signals. The communications device 1002 illustrated in FIG. 10 is a functional block diagram rather than a listing of specific components.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A method for embedding a first signal in the coding of a second signal, the method comprising:
   determining a value of a first signal;
   generating a codebook based on the value of the first signal;
   encoding a second signal using a codeword from the generated codebook;
   modulating the encoded second signal into a plurality of symbols, wherein the symbols are distributed according to the value of the first signal; and
   inserting the modulated symbols into one or more time slots of a sequence.

2. The method of claim 1, wherein the first signal comprises an acknowledgement (ACK) signal.

3. The method of claim 1, wherein the first signal comprises a negative acknowledgment (NACK) signal.

4. The method of claim 1, wherein the second signal comprises a channel quality indicator (CQI) signal.

5. The method of claim 1, wherein the first signal comprises two bits and comprises the values of 00, 01, 10 or 11.

6. The method of claim 1, wherein the second signal comprises eight bits.

7. The method of claim 1, wherein the codeword comprises 24-bits.

8. The method of claim 1, wherein the encoded second signal is modulated according to Quadrature Phase-Shift Key (QPSK) modulation.

9. The method of claim 1, wherein the distribution of the modulated symbols is determined by an error quality target for the first signal and the second signal.

10. The method of claim 9, wherein the first signal and the second signal have different error target qualities.

11. The method of claim 10, wherein the error target quality of the first signal comprises $10^{-4}$.

12. The method of claim 10, wherein the error target quality of the second signal comprises $10^{-1}$ to $10^{-2}$.

13. The method of claim 1, wherein the first signal comprises a plurality of bits.

14. The method of claim 1, wherein the second signal comprises a plurality of bits.

15. The method of claim 1, wherein the codeword comprises a plurality of bits.

16. A device that is configured to embed a first signal in the coding of a second signal, the device comprising:
- a processor;
- memory in electronic communication with the processor;
- instructions stored in the memory, the instructions being executable to:
  - determine a value of a first signal;
  - generate a codebook based on the value of the first signal;
  - encode a second signal using a codeword from the generated codebook;
  - modulate the encoded second signal into a plurality of symbols, wherein the symbols are distributed according to the value of the first signal; and
  - insert the modulated symbols into one or more time slots of a sequence.

17. The device of claim 16, wherein the first signal comprises an acknowledgement (ACK) signal.

18. The device of claim 16, wherein the first signal comprises a negative acknowledgment (NACK) signal.

19. The device of claim 16, wherein the second signal comprises a channel quality indicator (CQI) signal.

20. The device of claim 16, wherein the first signal comprises two bits and comprises the values of 00, 01, 10 or 11.

21. The device of claim 16, wherein the second signal comprises eight bits.

22. The device of claim 16, wherein the codeword comprises 24-bits.

23. The device of claim 16, wherein the encoded second signal is modulated according to Quadrature Phase-Shift Key (QPSK) modulation.

24. The device of claim 16, wherein the distribution of the modulated symbols is determined by an error quality target for the first signal and the second signal.

25. The device of claim 24, wherein the first signal and the second signal have different error target qualities.

26. The device of claim 25, wherein the error target quality of the first signal comprises $10^{-4}$.

27. The device of claim 25, wherein the error target quality of the second signal comprises $10^{-1}$ to $10^{-2}$.

28. The device of claim 16, wherein the first signal comprises a plurality of bits.

29. The device of claim 16, wherein the second signal comprises a plurality of bits.

30. The device of claim 16, wherein the codeword comprises a plurality of bits.

31. A computer-readable medium comprising executable instructions for embedding a first signal in the coding of a second signal, the instructions being executable to:
- determine a value of a first signal;
- generate a codebook based on the value of the first signal;
- encode a second signal using a codeword from the generated codebook;
- modulate the encoded second signal into a plurality of symbols, wherein the symbols are distributed according to the value of the first signal; and
- insert the modulated symbols into one or more time slots of a sequence.

* * * * *